A. WEISMANN.
ADVERTISING APPARATUS.
APPLICATION FILED AUG. 24, 1908.
942,021.
Patented Nov. 30, 1909.
3 SHEETS—SHEET 1.
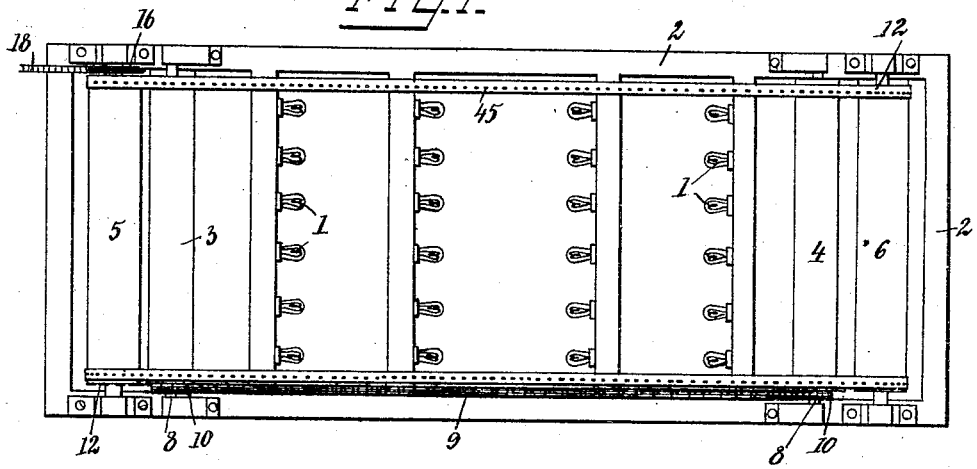
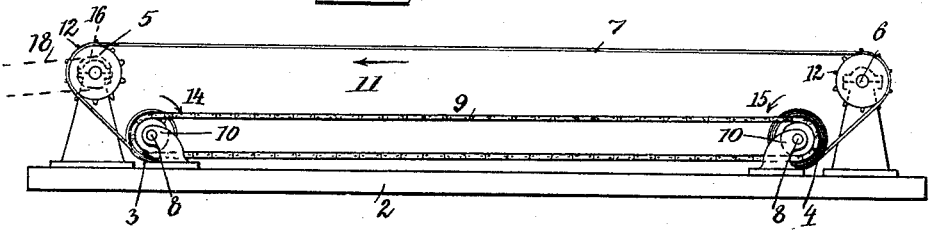
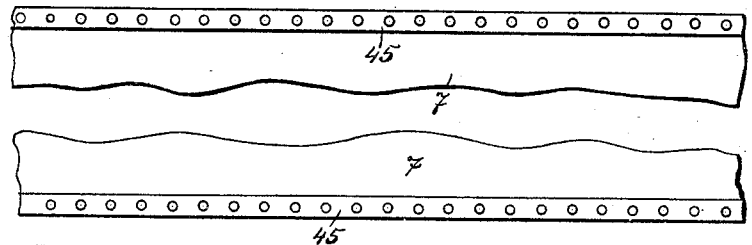
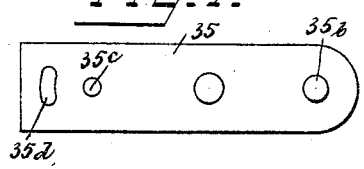 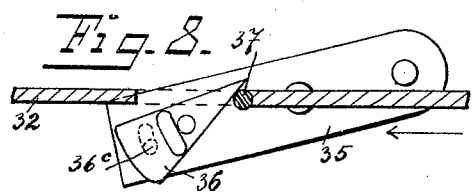
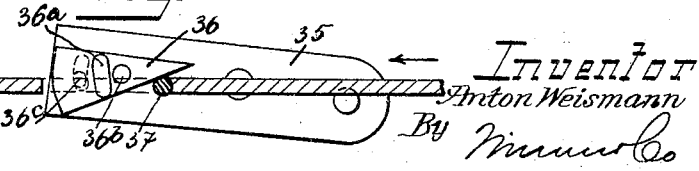
Witnesses
W. Köhler
J. P. Davis
Inventor
Anton Weismann
By Munn Co
Attorneys

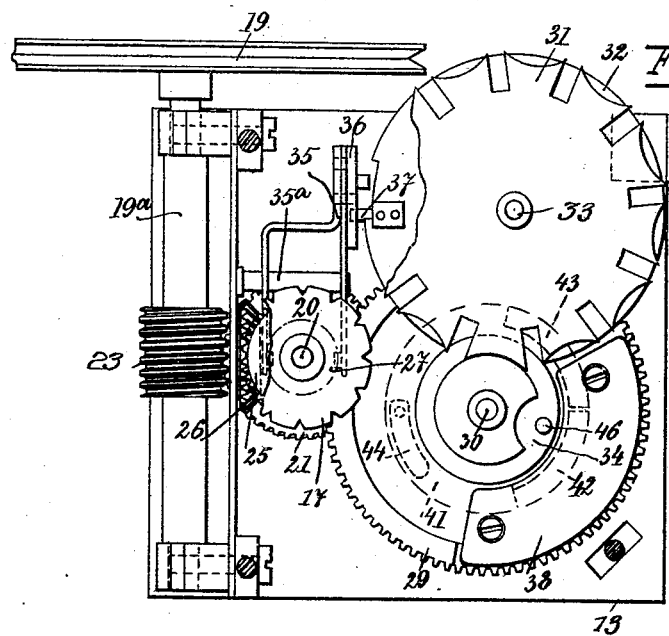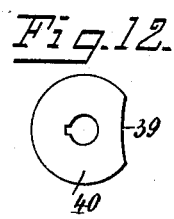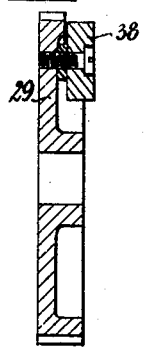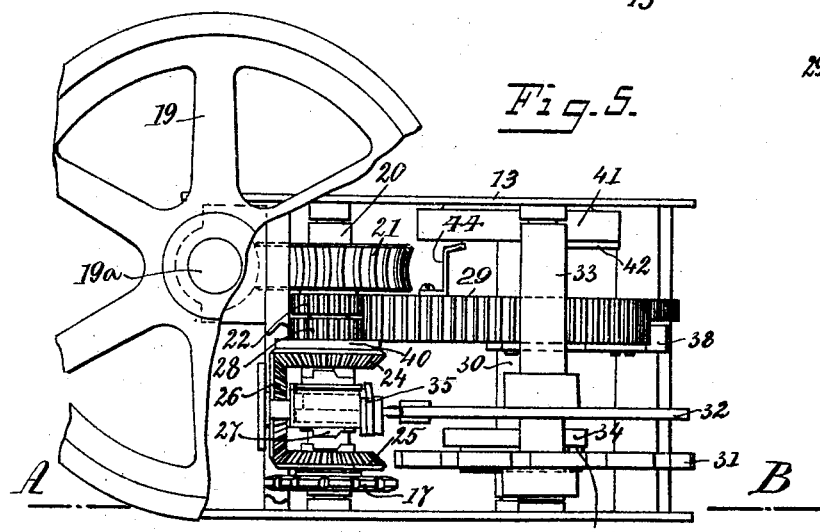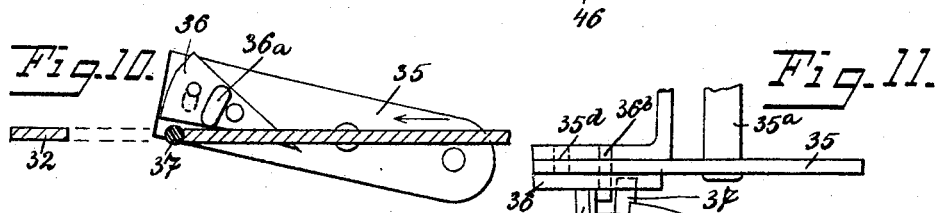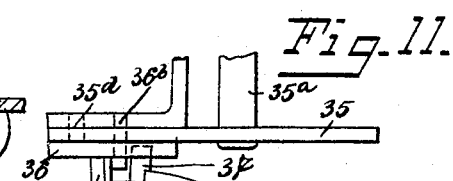

A. WEISMANN.
ADVERTISING APPARATUS.
APPLICATION FILED AUG. 24, 1908.

942,021.

Patented Nov. 30, 1909.
3 SHEETS—SHEET 3.

Witnesses
W. M. Avery
J. P. Davis

Inventor
Anton Weismann
By Munn & Co
Attorneys

UNITED STATES PATENT OFFICE.

ANTON WEISMANN, OF BERLIN, GERMANY.

ADVERTISING APPARATUS.

942,021.　　　　　Specification of Letters Patent.　　Patented Nov. 30, 1909.

Application filed August 24, 1908. Serial No. 450,090.

*To all whom it may concern:*

Be it known that I, ANTON WEISMANN, a subject of the Emperor of Austria-Hungary, residing at Berlin, in the Empire of Germany, have invented a new and useful Advertising Apparatus, of which the following is a specification.

My invention relates to advertising devices which are electrically illuminated and the object of the invention is to produce a device of the character indicated which is simple, durable and effective in operation.

The invention consists in the construction and combination of parts as hereinafter fully described and pointed out in the claims.

The invention is illustrated in the accompanying drawings, in which—

Figure 13:
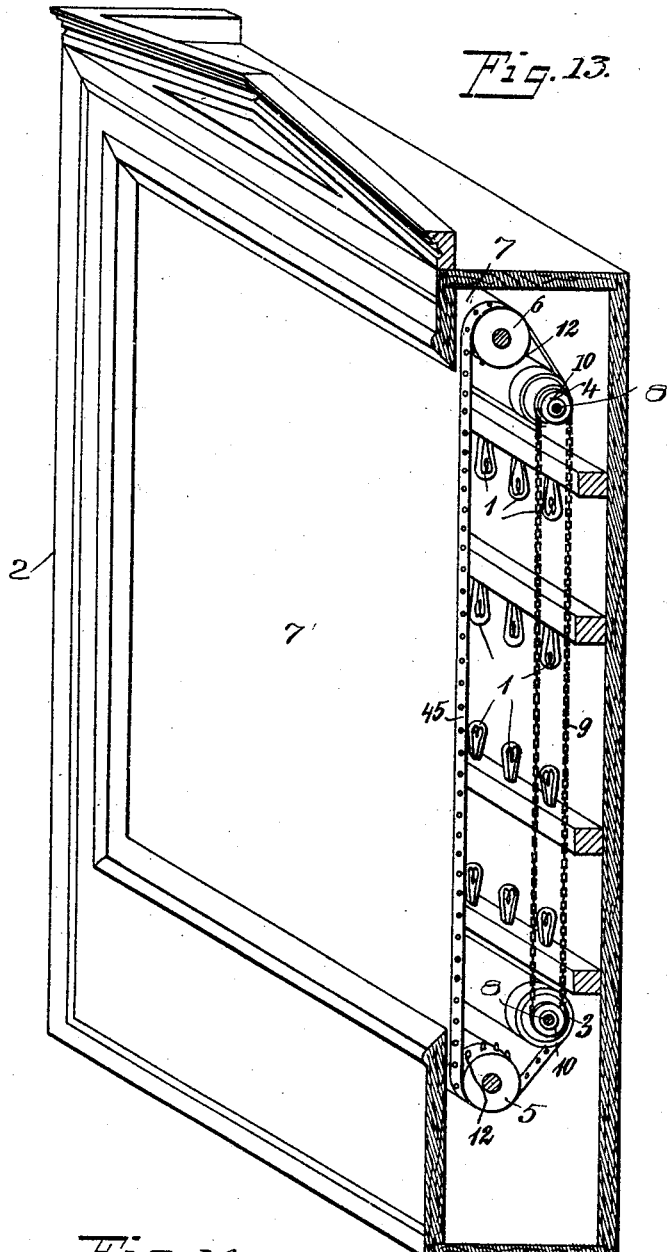
Figure 14:
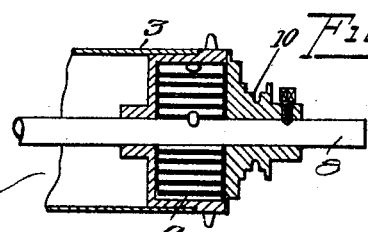
Figure 15:
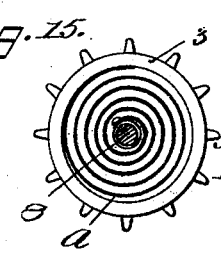

Figure 1 is a plan view of the frame carrying the electric lights and the supporting and guiding rollers for the advertising sheet, the body of the latter being removed. Fig. 2 is an elevation of the same. Fig. 3 is a view on an enlarged scale of a part of the advertising sheet, from which an intermediate part is omitted, Fig. 4 is a section through the driving mechanism on the line A—B in Fig. 5, when looked at from below, Fig. 5 is an elevation of the same, a part of the driving pulley being broken away, Figs. 6 to 12 are details which will be referred to later on, Fig. 13 is a perspective view partly in section of a modification. Fig. 14 is a sectional view of a portion of one of the principal rollers, and Fig. 15 is an end view of the same.

Similar characters of reference refer to similar parts throughout the several views.

A convenient frame 2 (Figs. 1 and 2) of any known and approved construction is provided with illuminating means, such as for example electric incandescent lamps 1, 1, and carries two guiding rollers 5 and 6 and the shafts 8, 8 of two principal rollers 3 and 4, all of which are mounted in it to turn. The two shafts 8, 8 are connected together by means of two chain wheels 10, 10 and an endless chain 9, so that when one of them is driven, the other is obliged to partake in its movement. Loose on the two shafts 8, 8 are the two principal rollers 3 and 4 which are connected with them by spiral springs of any known construction $a$, one of which is shown in Figs. 14 and 15. An advertising sheet 7 (Fig. 3) is assumed to be secured on two long perforated guiding strips 45, 45 of steel or the like, the ends of which are fastened on the two principal rollers 3 and 4. The two guiding rollers 5 and 6 are provided at their ends with pins 12, 12 which are set at like distances on their peripheries and are adapted to engage in the perforations of the two guiding strips 45, 45 for moving therewith the advertising sheet 7. One guiding roller 5 carries at one end a chain wheel 16 affixed on it and is adapted to be driven in either direction by means of an endless chain 18. The said spiral springs which connect the principal rollers 3 and 4 with their shafts 8, 8 are disposed in opposite senses to one another and are properly strained for tightening the advertising sheet 7. When the guiding roller 5 is so driven as to move the advertising sheet 7 in the direction of the arrow 11 in Fig. 2, the sheet 7 will be unwound from the one principal roller 4 in the direction of the arrow 15 and wound on the other principal roller 3 since it is pulled by the spiral spring within the latter. When the diameters of the two principal rollers 3 and 4 with the layers of advertising sheet on them are alike, their peripheral velocities will be alike and the tensions of the two spiral springs are equally alike, so that the two principal rollers 3 and 4 will turn simultaneously with their shafts 8, 8. When, however, the diameter of the principal roller 4 becomes smaller than that of the other principal roller 3, the angular velocity of the former will require to be larger than that of the latter, since the advertising sheet 7 is in a manner to be described hereinafter moved at a constant speed by the guiding roller 5. The difference in angular velocity between the two principal rollers 3 and 4 and their shafts 8, 8 is permitted by the spiral springs within the principal rollers, since the strains of these springs will constantly balance by means of the endless chain 9 for keeping the advertising sheet tight. There may be one or several openings in the frame, one being shown in Fig. 13, through which one or several sections of the advertising sheet 7 can be seen. Of course the frame 2 may be placed horizontally in case the section or sections of the advertising sheet 7 is or are to be visible from below or from above. Or the frame 2 may be placed in a vertical position as shown in Fig. 13 or in any other position.

The guiding roller 5 is driven from a mechanism illustrated at Figs. 4 and 5 and constructed as follows: In a frame 13 of any known and approved construction a shaft 19ª is mounted to turn and has fastened on it a driving pulley 19 which is driven at a constant speed from some motor or other source of power. A worm 23 fastened on the shaft 19ª meshes with a worm wheel 21 which in conjunction with a narrow pinion 22 is mounted loosely on a shaft 20, these two parts 21 and 22 being rigidly connected together. The shaft 20 is mounted in the frame 13 to turn and is parallel with the guiding roller 5 (Fig. 1) which is at a convenient distance from it. A chain wheel 17 is fastened on the shaft 20 and is connected with the chain wheel 16 on the guiding roller 5 by means of the endless chain 18. Two bevel wheels 24 and 25 are loose on the shaft 20 and constantly mesh with a third bevel wheel 26 which is mounted to turn on a pin on the frame 13. The one bevel wheel 24 is rigidly connected with a narrow pinion 28 and a disk 40 (Fig. 12), so that all of them can turn on the shaft 20, while they are prevented from endwise movement. The two bevel wheels 24 and 25 are provided with claws by means of which either of them can engage a clutch coupling 27 that is longitudinally movable on the shaft 20 while it is prevented from turning thereon by a feather or the like. A shaft 30 parallel to the shaft 20 is mounted in the frame 13 to turn and has fastened on it a gear wheel 29 and a catch disk 34. The gear wheel 29 has such a width that it can mesh with the two narrow pinions 22 and 28 which are made alike. It is cut out on a part of its periphery in such a manner, that while it constantly meshes with the one pinion 22, it can come out of engagement with the other pinion 28, which will then stop. In order to prevent the pinion 28 from shifting during this period a smooth segment 38 is preferably attached to the gear wheel 29 in its cut-out portion (see Fig. 6) and is adapted to engage in a cut 39 in the disk 40 mentioned above (Fig. 12), in which case both the pinion 28 and the bevel wheel 24 will be prevented from turning. If at this moment the clutch coupling 27 engages the claws of either the bevel wheel 24 or the bevel wheel 25, of course the shaft 20 with the chain wheel 17 will be prevented from turning, so that the guiding roller 5 and therewith also the advertising sheet 7 will stop. A circular disk 41 of wood or other insulating material is fastened on the frame 13 concentrically with the shaft 30 and carries two or more metallic contact strips 42, 43, which are electrically connected by lines with all of the incandescent lamps 1, 1 or severally with sections of them, so that one or more circuits containing the lamps 1, 1 and suitable sources of current are formed.

One contact spring 44 secured on the gear wheel 29 is adapted to engage the two contact strips 42 and 43 or any of the several contact strips during a part of one complete revolution of the shaft 30 and thereby to close the single circuit or the several circuits consecutively for lighting the lamps 1, 1. Obviously in the latter case the lamps 1, 1 may be divided into several groups of differently colored lamps, which groups can then be lighted one after the other during each revolution of the shaft 30.

A shaft 33 parallel to the shaft 30 is mounted in the frame 13 to turn and has fastened on it a star wheel 31 and a notched disk 32. The star wheel 31 has as many radial slots as there are sections into which the advertising sheet 7 is divided; in Fig. 4 it has fourteen radial slots in which a pin 46 on the catch disk 34 can consecutively engage for turning the star wheel 31 each time a distance equal to the distance apart of its radial slots. The periphery of the catch disk 34 engaging in any shallow recess of the star wheel 31 will prevent the latter from turning until the pin 46 engages in its following radial slot for turning it. The notched disk 32 having in its periphery a notch 32ª serves for shifting the clutch coupling 27 on the shaft 20 from its one extreme position to its other extreme position and vice versa in the following manner. A forked two-armed lever 35 rocking on a pin 35ª (Fig. 11) on the frame 13 is adapted to engage with its one end in the clutch coupling 27 in any known manner and carries on its other end a rocking lock 36. The ends of the forked arm of the lever 35 may have each for example a hole 35ᵇ (Fig. 7) in which a pin on a sleeve can engage, this sleeve being turnable in a groove of the clutch coupling 27. The other end of the lever has a screw-threaded hole 35ᶜ and a slot 35ᵇ. In the hole 35ᶜ engages a pin 36ᵇ (Figs. 9 and 11) on which the lock 36 is mounted to rock. The lock 36 is triangular (see Figs. 8 to 10) and has a projection 36ª and a pin 36ᶜ which latter engages in the slot 35ᵈ so that the turn of the lock 36 on the lever 35 is thereby limited. As is shown in Figs. 8 to 10, the notched disk 32 is located in the horizontal plane of the pin 35ª, in other words the fulcrum of the rocking lever 35. Normally the projection 36ª bears on the periphery of the disk 32, either from above or from below, and the pin 36ᶜ of the lock 36 bears against either end of the slot 35ᵈ so that the two-armed lever 35 is thereby prevented from shifting and remains in either of its extreme positions, in which the clutch coupling 27 engages the claws of either of the two bevel wheels 24 and 25. It is to be noted, that the disk 32 in Figs. 8 to 10 is shown in a developed section through the curved line C—D in Fig. 11. The point of the lock 36 will then project above (Fig. 8) or beneath (Fig. 10) the disk 32, so that a pin 37 (Fig. 11) provided on the latter will during the revolution of the latter in the direction of the arrow at last strike the lock 36 (Fig. 8) and raise it (Fig. 9) and thereby shift the lever 35 into its other extreme position (Fig. 10), since the lock 36 is prevented from turning on the lever 35 by its pin 36$^c$ bearing on the lower end of the slot 35$^d$ of the lever 35. Then the projection 36$^a$ which hitherto bore against the disk 32 from below will henceforward bear on the disk 32 from above. Obviously the notch 32$^a$ in the periphery of the disk 32 is necessary for permitting the projection 36$^a$ of the lock 36 to pass through it during the reversal of the two-armed lever 35. It is evident, that at the end of the following revolution of the disk 32 its pin 37 will strike the upper edge of the lock 36 and depress the latter and thereby also the rear arm of the lever 35 for shifting the latter into its initial position. It will be seen, that thereby the direction of the movement of the advertising sheet 7 is reversed on the completion of every revolution of the star wheel 31, in other words on the advertising sheet 7 being fully wound off one and on the other of the two principal rollers 3 and 4.

The advertising apparatus operates as follows: Assuming the advertising sheet 7 to be fully wound off the principal roller 3 and wound on the other principal roller 4, the guiding roller 5 being arranged to move the advertising sheet 7 in the direction of the arrow 11 in Fig. 2 and the notch 32$^a$ of the disk 32 having moved out of reach of the projection 36$^a$ on the lock 36, then the clutch coupling 27 will engage the claws of say the bevel wheel 24. The segment 38 being still in engagement with the cut 39 in the disk 40 will prevent the three bevel wheels 24, 26 and 25 from turning, so that the advertising sheet 7 will stop. During the rotation of the shaft 30 the contact spring 44 on the gear wheel 29 will by engaging the two contact strips 42 and 43 close the circuit for lighting all the incandescent lamps 1, 1, so that the section of the advertising sheet 7 registering with the opening in the frame will be illuminated. In case the incandescent lamps are divided into groups of differently colored lamps, of course during a part of one complete revolution of the shaft 30 the contact spring 44 sliding over several contact strips 42, 43, will close the several circuits one after the other, so that the several groups of differently colored lamps 1, 1 will be lighted one after the other for illuminating the first section of the advertising sheet 7. After the single circuit or the last of the several circuits has been reopened, the pin 46 on the catch disk 34 will engage in the next radial slot of the star wheel 31 for turning the latter forward, and at the same time the segment 38 will come out of engagement with the cut 39 in the disk 40, while the uncut portion of the gear wheel 29 will engage in the narrow pinion 28, so that the rotation of the driving pulley 19 will be transmitted by means of the worm 23 and the worm wheel 21, through the pinion 22, the gear wheel 29 and the pinion 28 to the three bevel wheels 24, 26 and 25. As the clutch coupling 27 engages the bevel wheel 24, of course it is the latter, which by the shaft 20, the chain wheel 17, the endless chain 18 and the chain wheel 16 puts the guiding roller 5 in rotation for feeding forward the advertising sheet 7 in the direction of the arrow 11. At the moment that the first section of the advertising sheet 7 has left the opening of the diaphragm and the second section is visible in this opening, the segment 38 will engage in the cut 39 of the disk 40, while the gear wheel 29 comes out of engagement with the pinion 28, so that the advertising sheet 7 will stop, whereupon the incandescent lamps 1, 1 will be lighted in the manner described above for illuminating the second section of the advertising sheet 7. Thus the advertising sheet 7 will be fed forward intermittently and its several sections will be illuminated one after the other, until it is fully wound off the principal roller 4 and wound on the other principal roller 3. At this moment the pin 37 on the disk 32 will strike the lock 36 and thereby reverse the forked two-armed lever 35 in the manner described above. The consequence of this is, that the clutch coupling 27 is shifted into its other extreme position for engaging in the claws of the bevel wheel 25 which turns in a direction opposite to that of the bevel wheel 24, so that the advertising sheet 7 will be henceforward fed rearward intermittently, while the driving pulley continues revolving in the same direction. The sheet 7 is wound off the principal roller 3 in the direction of the arrow 14 and is wound on the other principal roller 4, while its sections are displayed one after the other in the reversed order.

In case it is desired to continually feed the advertising sheet 7 in one or the other direction without stopping, the smooth segment 38 can be taken off and replaced by a toothed segment adapted to fill the cut-out portion of the gear wheel 29, so that the pinion 28 will constantly mesh with the gear wheel 29. Or the pinion 28 may be coupled to the pinion 22 for partaking in its revolution. The advertising sheet 7 may be itself provided with perforations along its longitudinal edges, in which case the two perforated guiding strips 45, 45 are omitted.

I claim:

1. In a device of the class described, the combination with a frame, of a shaft mounted in said frame to turn, a gear wheel loose on said shaft, means for driving said gear wheel at a constant speed, two opposite bevel wheels loose on said shaft and one of them connected with said gear wheel, a pin on the frame, a third bevel wheel mounted to turn on said pin and meshing with said two bevel wheels, a clutch coupling longitudinally movable on said shaft and prevented from turning, it being adapted to engage either of said two opposite bevel wheels, means operated by said gear wheel for periodically shifting said clutch coupling from one extreme position to the other one and vice versa, two spaced rollers, an advertising sheet fastened on said two rollers, two guiding rollers adapted to engage said advertising sheet for winding it off one and on the other of said two rollers, and means for operating one of the said guiding rollers from said shaft.

2. In a device of the class described, the combination with a frame, of a shaft mounted in said frame to turn, a gear wheel loose on said shaft, means for driving said gear wheel at a constant speed, a disk loose on said shaft and having a cut, two opposite bevel wheels loose on said shaft and one of them rigidly connected with said disk, two like pinions loose on said shaft and one of them connected with said gear wheel and the other with said disk, a pin on the frame, a third bevel wheel mounted to turn on said pin and meshing with said two bevel wheels, a clutch coupling longitudinally movable on said shaft and prevented from turning, it being adapted to engage either of said two opposite bevel wheels for driving said shaft in either direction, a second shaft mounted in said frame to turn, a second gear wheel on said second shaft and being cut out so that it permanently meshes with the pinion connected with said gear wheel and periodically meshes with the other pinion, a segment in the cut-out portion of said second gear wheel and adapted to engage in the cut of said disk for preventing it from turning, a catch disk fastened on said second shaft, a third shaft mounted in said frame to turn, a star wheel fastened on said third shaft and so controlled from said catch disk that it is periodically fed forward and stopped, a third disk fastened on said third shaft, a two-armed lever rocking on said frame and adapted to be controlled from said third disk for once on every revolution shifting said clutch coupling from one extreme position to the other one or vice versa, an advertising sheet, and means for operating the said sheet from the first named shaft.

3. In a device of the class described, a frame, a shaft mounted in the frame and driven at a constant speed, a second shaft mounted in the frame, a gear wheel loose on the second shaft, means for operating said gear wheel from the first shaft, two bevel wheels loose on the second shaft, one of them being connected with the gear wheel, a third bevel wheel mounted in the frame and meshing with the said two bevel wheels, a clutch coupling longitudinally movable on the second shaft and adapted to engage either of the two opposite bevel wheels, means operated by said gear wheel for periodically shifting the clutch coupling, two spaced rollers, an advertising sheet carried by said rollers, means for operating the advertising sheet from said second shaft, an illuminating device, and means controlled by the clutch coupling operating means for periodically lighting the illuminating device.

4. In a device of the class described, a frame, a shaft mounted in the frame and driven at a constant speed, a second shaft mounted in the frame, a gear wheel loose on the second shaft, means for operating said gear wheel from the first shaft, two opposite bevel wheels loose on the second shaft, one of them being connected with the said gear wheel, a third bevel wheel mounted in the frame and meshing with the said two bevel wheels, a clutch coupling movable on the second shaft and adapted to engage either of the two opposite bevel wheels, means operated by said gear wheel for periodically shifting the clutch coupling, two spaced rollers, an advertising sheet carried by said rollers, guiding rollers over which the advertising sheet passes, means for operating one of the guiding rollers from the second shaft, an illuminating device, and means controlled by the clutch coupling operating means for periodically lighting the illuminating device.

ANTON WEISMANN.

Witnesses:
WOLDEMAR HAUPT,
HENRY HASPER.